W. W. ALLEN.
DEMOUNTABLE RIM.
APPLICATION FILED NOV. 30, 1917.
1,277,024.
Patented Aug. 27, 1918.
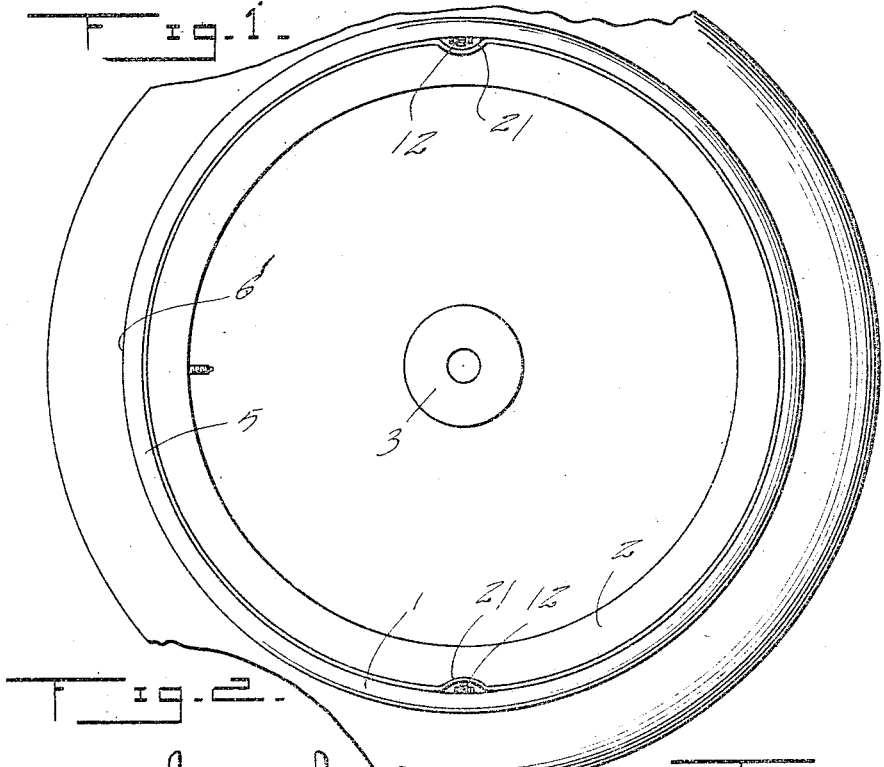
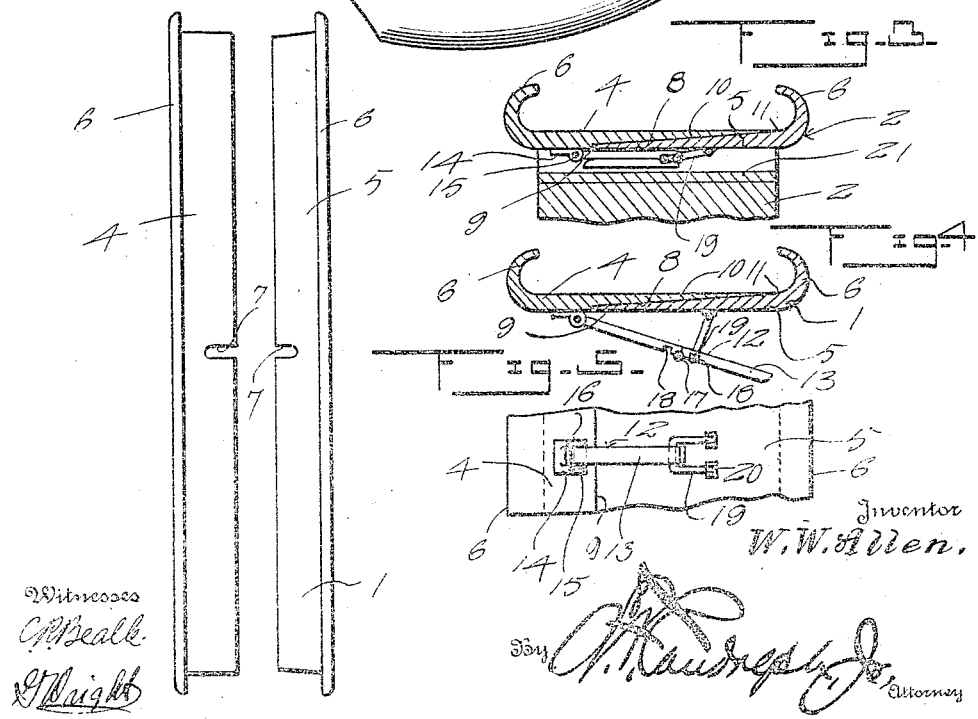
Inventor
W. W. Allen.

UNITED STATES PATENT OFFICE.

WILLIAM W. ALLEN, OF WASHINGTON, DISTRICT OF COLUMBIA.

DEMOUNTABLE RIM.

1,277,024.   Specification of Letters Patent.   Patented Aug. 27, 1918.

Application filed November 30, 1917. Serial No. 204,707.

*To all whom it may concern:*

Be it known that I, WILLIAM W. ALLEN, a citizen of the United States, residing at Washington, in the District of Columbia, have invented certain new and useful Improvements in Demountable Rims; and I do hereby declare the following to be a full, clear, and exact description of the invention, such as will enable others skilled in the art to which it appertains to make and use the same.

This invention relates to vehicle rims and more particularly to demountable rims for pneumatic tires for motor vehicles, and the primary object of the invention is to provide an improved rim formed of separate detachable sections, which will allow the tire casing to be easily removed from and placed on the rim.

Another object of the invention is to provide an improved means for holding the separate sections of the rim in locked position, so as to absolutely prevent the displacement of the tire casing and hold the rim together when the same is removed from the felly.

A further object of the invention is to provide an improved demountable rim for motor vehicles formed in a pair of separate detachable sections, which are so formed in relation to each other, that the same when united will form a strong and rigid structure.

A still further object of the invention is to provide an improved demountable rim for motor vehicles, which is durable and efficient in use and one that is simple and easy to manufacture, and one that can be placed upon the market at a reasonable price.

With these and other objects in view, the invention consists in the novel construction, arrangement of parts as will be hereinafter more specifically described, claimed and illustrated in the accompanying drawing, forming a part thereof, in which:

Figure 1 is a front elevation of the improved rim in position on a vehicle wheel.

Fig. 2 is a side elevation of the improved rim showing the two sections separated.

Fig. 3 is a transverse section through the rim and felly showing the sections of the rim in locked position.

Fig. 4 is a transverse section through the rim removed from the felly showing the same prior to being locked, and Fig. 5 is a fragmentary interior view showing the lock.

Referring to the drawing in detail, wherein similar reference numerals designate corresponding parts throughout the several views, the numeral 1 generally indicates the improved vehicle rim, which is adapted to be removably attached to the felly 2 of a wheel 3 in the ordinary or any preferred manner. The improved rim 1 includes two separate sections 4 and 5 which have formed on their opposed side edges tire engaging flanges 6. Each of the annular rim sections 4 and 5 respectively is provided with an inwardly directed slot 7 formed in their inner meeting edges. These slots are in alinement with each other and form means to hold the tire valve. The rim sections 4 and 5 are so formed as to overlap each other and the outer section 4 is internally cut away from a point adjacent the tire engaging flange to the opposite edge defining the annular internal shoulder 9. The inner section 5 has its external surface gradually tapered from a point adjacent the tire engaging flange 6 to its opposite end as at 10 to conform to the cut away portion 8 formed in the other rim section. The tapered portion forms an annular shoulder 11 adjacent the clencher rim and these shoulders 9 and 11 engage the inner edges of the rim section and limit the inward movement thereof.

The rim sections 4 and 5 are provided with a locking means 12, which holds the rim sections in operative position. The locking means 12 includes a lever 13 which is hingedly connected at its inner end to the internal surface of the rim section 4. A suitable bracket 14 is riveted or otherwise secured to the internal surface of the rim 4 and has spaced ears 15 which receives the inner end of the lever 13 and a suitable pivot pin 13 extends through the ears and levers, and holds the same pivotally connected to the rim. The lever 13 is formed in two separate sections, which are pivotally connected to each other as at 17. Each of the lever sections are provided with a notched portion 18 adjacent to the hinge 17 and the notches formed in the outer lever section are adapted to receive a link 19 having its ends pivoted as at 20 to the internal surface of the rim section 5. The outer surface of the felly 2 is provided with spaced transversely extending pockets 21, which forms means for accommodating the locking device 12.

In operation of the improved locking means the rim sections 4 and 5 are brought together and the link 19 is positioned in the notched portion 18 of the outer lever section and the same is then swung on the pivot 17 toward the opposite lever section and at the same time the lever is forced upwardly and when the outer lever section is in engagement with the inner lever section the link is firmly secured in place and displacement of the rim sections is prevented.

In practice, I have found that the form of my invention, illustrated in the accompanying drawings and referred to in the above description, as the preferred embodiments, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What is claimed is:—

In combination, a demountable tire rim including a pair of annular telescoping interfitting sections, means engaging said sections to hold the same in engagement with each other and including a loop pivotally secured to one section, a two part lever pivotally secured to the opposite section, the parts of said lever being hingedly secured to each other and having a notch formed on each side of the hinge, one part of said lever being adapted to overlie and engage the other part, the notches being adapted to aline with each other to form a closed compartment, the notches being adapted to receive the pivoted link, as and for the purpose specified.

In testimony whereof I affix my signature in presence of two witnesses.

WILLIAM W. ALLEN.

Witnesses:
MAURICE KRESSIN,
B. A. LEATHERMAN.